United States Patent
Zednicek et al.

(10) Patent No.: US 9,842,704 B2
(45) Date of Patent: Dec. 12, 2017

(54) LOW ESR ANODE LEAD TAPE FOR A SOLID ELECTROLYTIC CAPACITOR

(71) Applicant: AVX Corporation, Fountain Inn, SC (US)

(72) Inventors: Stanislav Zednicek, Lanskroun (CZ); Lotfi Djebara, Paris (FR); Ludek Kubes, Lanskroun (CZ); Radek Matousek, Moravska Trebova (CZ); Pavel Bosak, Lanskroun (CZ); Jiri Snitil, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 57 days.

(21) Appl. No.: 14/817,533

(22) Filed: Aug. 4, 2015

(65) Prior Publication Data

US 2017/0040118 A1    Feb. 9, 2017

(51) Int. Cl.
*H01G 9/15* (2006.01)
*H01G 9/012* (2006.01)
*H01G 9/052* (2006.01)

(52) U.S. Cl.
CPC .............. *H01G 9/15* (2013.01); *H01G 9/012* (2013.01); *H01G 9/052* (2013.01)

(58) Field of Classification Search
CPC ......... H01G 9/012; H01G 9/15; H01G 9/0029
See application file for complete search history.

(56) References Cited

U.S. PATENT DOCUMENTS

| | | | |
|---|---|---|---|
| 3,345,545 A | 10/1967 | Bourgault et al. | |
| 3,612,957 A | 10/1971 | Steigerwald | |
| 4,097,916 A | 6/1978 | Piper | |
| 4,330,929 A * | 5/1982 | Cripe | H01G 9/10 264/102 |

(Continued)

FOREIGN PATENT DOCUMENTS

| | | | |
|---|---|---|---|
| JP | 03196511 A | * | 8/1991 |
| JP | 2001307957 A | * | 11/2001 |

(Continued)

OTHER PUBLICATIONS

Abstract of Japanese Patent—JP2001057319 A, Feb. 27, 2001, 2 pages.

(Continued)

*Primary Examiner* — David M Sinclair
(74) *Attorney, Agent, or Firm* — Dority & Manning, P.A.

(57) ABSTRACT

A solid electrolytic capacitor including a capacitor element and an anode lead assembly is provided. The capacitor element includes a sintered, porous anode body; a dielectric layer overlying the sintered, porous anode body; and a cathode overlying the dielectric layer that includes a solid electrolyte. The anode lead assembly includes an anode lead tape having an embedded portion positioned within the anode body and an external portion extending from a surface of the anode body in a longitudinal direction, where the width of the anode lead tape is greater than the height of the anode lead tape. Meanwhile, a carrier lead wire is positioned external to the anode body and includes a first portion and a second portion. The first portion has a substantially planar surface that is connected to the substantially planar surface of the external portion of the anode lead tape.

20 Claims, 4 Drawing Sheets

(56) References Cited

U.S. PATENT DOCUMENTS

| | | | |
|---|---|---|---|
| 4,409,642 A * | 10/1983 | Edson | H01G 9/012 29/25.03 |
| 4,945,452 A | 7/1990 | Sturmer et al. | |
| 5,111,327 A | 5/1992 | Blohm et al. | |
| 5,179,507 A * | 1/1993 | Iijima | H01G 9/0003 361/534 |
| 5,457,862 A | 10/1995 | Sakata et al. | |
| 5,469,326 A * | 11/1995 | Kanetake | H01G 9/012 361/529 |
| 5,473,503 A | 12/1995 | Sakata et al. | |
| 5,729,428 A | 3/1998 | Sakata et al. | |
| 5,812,367 A | 9/1998 | Kudoh et al. | |
| 5,949,639 A | 9/1999 | Maeda et al. | |
| 6,191,936 B1 | 2/2001 | Webber et al. | |
| 6,197,252 B1 | 3/2001 | Bishop et al. | |
| 6,322,912 B1 | 11/2001 | Fife | |
| 6,391,275 B1 | 5/2002 | Fife | |
| 6,416,730 B1 | 7/2002 | Fife | |
| 6,447,570 B1 | 9/2002 | Pozdeev-Freeman | |
| 6,527,937 B2 | 3/2003 | Fife | |
| 6,576,099 B2 | 6/2003 | Kimmel et al. | |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,665,172 B1 | 12/2003 | Kim et al. | |
| 6,674,635 B1 | 1/2004 | Fife et al. | |
| 6,987,663 B2 | 1/2006 | Merker et al. | |
| 7,072,171 B1 | 7/2006 | Muffoletto et al. | |
| 7,116,548 B2 | 10/2006 | Satterfield, Jr. et al. | |
| 7,154,742 B1 | 12/2006 | Hahn et al. | |
| 7,220,397 B2 | 5/2007 | Kimmel et al. | |
| 7,262,511 B2 | 8/2007 | Osako et al. | |
| 7,341,705 B2 | 3/2008 | Schnitter | |
| 7,342,775 B2 | 3/2008 | Hahn et al. | |
| 7,359,181 B2 | 4/2008 | Kuriyama | |
| 7,381,396 B2 | 6/2008 | Thomas et al. | |
| 7,419,926 B2 | 9/2008 | Schnitter et al. | |
| 7,515,396 B2 | 4/2009 | Biler | |
| 7,594,937 B2 | 9/2009 | Amita et al. | |
| 7,646,589 B2 | 1/2010 | Kuriyama | |
| 7,787,235 B2 | 8/2010 | Fujita et al. | |
| 7,929,274 B2 | 4/2011 | Reed et al. | |
| 8,066,783 B2 | 11/2011 | Takeda | |
| 8,313,538 B2 | 11/2012 | Merker et al. | |
| 8,482,902 B2 | 7/2013 | Ishida et al. | |
| 8,630,084 B2 | 1/2014 | Saida et al. | |
| 2004/0136144 A1 * | 7/2004 | Hirota | H01G 9/04 361/523 |
| 2005/0237698 A1 | 10/2005 | Postage et al. | |
| 2007/0253147 A1 | 11/2007 | Marek et al. | |
| 2009/0103243 A1 | 4/2009 | Mizukoshi et al. | |
| 2009/0237867 A1 * | 9/2009 | Kurokawa | H01G 9/012 361/540 |
| 2009/0279232 A1 | 11/2009 | Druding et al. | |
| 2010/0079930 A1 * | 4/2010 | Hayashi | H01G 9/012 361/534 |
| 2011/0085285 A1 | 4/2011 | Zednicek et al. | |
| 2013/0321986 A1 * | 12/2013 | Djebara | B23K 11/20 361/528 |

FOREIGN PATENT DOCUMENTS

| | | | |
|---|---|---|---|
| JP | 2003217974 A * | 7/2003 | |
| JP | 2004253501 A * | 9/2004 | |
| JP | 2004349725 A * | 12/2004 | |
| JP | 2011071151 A * | 4/2011 | |
| WO | WO 98/49356 | 11/1998 | |
| WO | WO 2005/106905 A1 | 11/2005 | |
| WO | WO 2006/057445 A1 | 6/2006 | |

OTHER PUBLICATIONS

Abstract of Japanese Patent—JP2001217160 A, Aug. 10, 2001, 2 pages.

Abstract of Japanese Patent—JP2001307957 A, Nov. 2, 2001, 2 pages.

Abstract of Japanese Patent—JP2003332173 A, Nov. 21, 2003, 2 pages.

Hahn et al., "Strategies for Manufacturing Ultra Low ESR Ta Capacitors," Carts USA, Mar. 21-24, 2005, Palm Springs, California, 7 pages.

Abstract of Japanese Patent—JPH0722289 A, Jan. 24, 1995, 2 pages.

Abstract of Japanese Patent—JPH088143 A, Jan. 12, 1996, 2 pages.

Abstract of Japanese Patent—JP2000012387 A, Jan. 14, 2000, 2 pages.

Abstract of Japanese Patent—JP2003229327 A, Aug. 15, 2013, 2 pages.

Abstract of Japanese Patent—JP2004253501 A, Sep. 9, 2004, 1 page.

Abstract of Japanese Patent—JP2004281619 A, Oct. 7, 2004, 1 page.

Abstract of Japanese Patent—JP2005033097 A, Feb. 3, 2005, 2 pages.

Abstract of Japanese Patent—JP2006295075 A, Oct. 26, 2006, 1 page.

Abstract of Japanese Patent—JP2008187091 A, Aug. 14, 2008, 2 pages.

Abstract of Japanese Patent—JP2008305824 A, Dec. 18, 2008, 2 pages.

Abstract of Japanese Patent—JP2009266931 A, Nov. 12, 2009, 2 pages.

Hintz et al., "Anode Lead Wire Pre-Treatments for Improved Lead Wire Bonding in Tantalum Capacitor Anodes Processed by De-Oxidation/Sintering," Carts USA, Mar. 15-18, 2010, New Orleans, Louisiana, 13 pages.

Vasina et al., "Failure Modes of Tantalum Capacitors Made by Different Technologies," Carts USA, Mar./Apr. 2001, 6 pages.

Machine Translation of Japanese Patent JPS 5718317A, Publication Date Jan. 30, 1982, 4 pages.

* cited by examiner

LOW ESR ANODE LEAD TAPE FOR A SOLID ELECTROLYTIC CAPACITOR

BACKGROUND OF THE INVENTION

Solid electrolytic capacitors (e.g., tantalum capacitors) have been a major contributor to the miniaturization of electronic circuits and have made possible the application of such circuits in extreme environments. The anode of a typical solid electrolytic capacitor includes a porous anode body, with an anode lead extending beyond the anode body and connected to an anode termination of the capacitor. The anode can be formed by first pressing a tantalum powder into a pellet that is then sintered to create fused connections between individual powder particles. One problem with many conventional solid electrolytic capacitors is that the small particle size of the tantalum particles can decrease the volumetric contact between the anode body and the anode lead. In fact, it can be difficult to find many points of contact between the anode lead and the powder particles. When the contact area between the anode body and the anode lead is decreased, there is a corresponding increase in resistance where the anode lead and the anode meet. This increased equivalent series resistance (ESR) results in a capacitor exhibiting decreased electrical capabilities. On the other hand, as the diameter of an anode lead is increased, the internal resistance in the anode lead itself increases, and this increase in internal resistance can counteract any improvement (decrease) in ESR seen as the result of increasing the points of contact between the anode body and the anode lead. Further, increasing the diameter or width of the anode lead increases the energy required to resistance weld or laser weld the anode lead to an anode termination portion of a leadframe.

As such, a need currently exists for an improved solid electrolytic capacitor that finds a balance between the benefit of increased points of contact between the anode body and the anode lead without the negative effects of increased resistance in the lead itself as its diameter increases, thereby significantly improving electrical capabilities of the capacitor by achieving ultralow ESR levels. A need also exists where such a balance can be found while also minimizing the energy needed to electrically connect the anode lead to an anode termination.

SUMMARY OF THE INVENTION

In accordance with one embodiment of the present invention, a solid electrolytic capacitor is disclosed that includes a capacitor element and an anode lead assembly. The capacitor element includes a sintered, porous anode body; a dielectric layer overlying the sintered, porous anode body; and a cathode overlying the dielectric layer that includes a solid electrolyte. The anode lead assembly includes an anode lead tape that has an embedded portion positioned within the sintered, porous anode body and an external portion extending from a surface of the sintered, porous anode body in a longitudinal direction as well as a carrier lead wire positioned external to the sintered, porous anode body. Further, the anode lead tape has a width and a height, where the width of the anode lead tape is greater than the height of the anode lead tape. In addition, the carrier lead wire is positioned external to the sintered, porous anode body and includes a first portion and a second portion, where the first portion includes a substantially planar surface. Further, the substantially planar surface of the first portion of the carrier lead wire is connected to the external portion of the anode lead tape.

In accordance with another embodiment of the present invention, a method for forming a solid electrolytic capacitor is disclosed. The method includes positioning an anode lead tape within a powder formed from a valve metal composition such that the anode lead tape includes an embedded portion located within a porous anode body and an external portion extending from a surface of the anode body in a longitudinal direction, wherein the anode lead tape has a width and a height, where the width of the anode lead tape is greater than the height of the anode lead tape; compacting the powder around the embedded portion of the anode lead tape; sintering the compacted powder to form a sintered, porous anode body; positioning a carrier lead wire external to the sintered, porous anode body, wherein the carrier lead wire comprises a first portion and a second portion, wherein the first portion includes a substantially planar surface; connecting the substantially planar surface of the first portion of the carrier lead wire to the external portion of the anode lead tape; and connecting the second portion of the carrier lead wire to an anode termination to form an electrical connection between the second portion of the anode lead wire and the anode termination.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
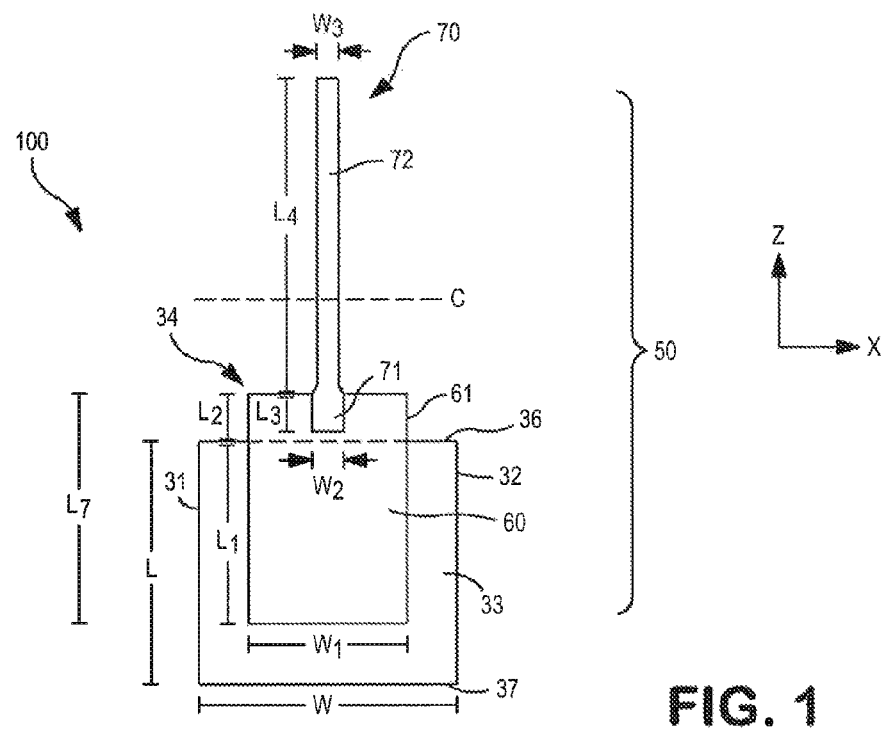
FIG. 1 is a cross-sectional top view of one embodiment of an electrolytic capacitor element of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended to limit the broader aspects of the present invention.

Generally speaking, the present invention is directed to a solid electrolytic capacitor containing a capacitor element that includes a sintered porous anode body, a dielectric layer overlying the sintered porous anode body, and a cathode overlying the dielectric layer that includes a solid electrolyte. The capacitor also includes an anode lead assembly that includes an anode lead tape and a carrier lead wire. The anode lead tape has an embedded portion positioned within the porous anode body and an external portion extending from a surface of the porous anode body in a longitudinal direction. The external portion of the anode lead tape can include a substantially planar surface. The substantially planar surface can be formed by flattening, crimping, or otherwise altering the geometry of all or a part of the external portion of the anode lead tape, or the anode lead tape can be shaped such that it has a substantially planar surface in the first instance. Further, the capacitor includes a carrier lead wire positioned external to the porous anode body, where the carrier lead wire includes a first portion and a second portion, where the first portion includes a substantially planar surface. The substantially planar surface can be formed by flattening, crimping, or otherwise altering the geometry of the first portion of the second lead wire.

As a result, in some embodiments, the first portion of the carrier lead wire has a dimension (e.g., a height/thickness) that can be smaller than a corresponding dimension (e.g., a height/thickness) of the second portion of the carrier lead wire. In addition, the substantially planar surface of the first portion of the carrier lead wire can be in contact with the substantially planar surface of the external portion of the anode lead tape, where the substantially planar surfaces facilitate the welding of the carrier lead wire to the anode lead tape by ensuring that the surfaces (e.g., the upper surface of the external portion of the anode lead tape and the lower surface of the first portion carrier lead wire, or vice versa) that are in contact with each other are both generally flat or level such that an adequate connection can be made. By utilizing an anode lead tape having an external portion that has a substantially planar surface and a carrier lead wire having a first portion that has a substantially planar surface, the present inventors have found that the external portion of the anode lead tape and the first portion of the carrier lead wire can be more effectively and easily connected together by resistance welding.

Further still, the anode lead tape and the carrier lead wire can be made of different materials. For instance, the anode lead tape can be tantalum, while the carrier lead wire can be a non-tantalum material (e.g., stainless steel, nickel, or a nickel-iron alloy). In this manner, a more cost-effective leadframe assembly can be utilized, as the material cost for carrier lead wire can be less than the material cost for the anode lead tape. In such embodiments, using a non-tantalum carrier lead wire to carry the anodes during chemical processes such as anodization and cathode buildup can reduce material costs. For instance, as part of the second portion of the carrier lead wire is eventually trimmed away from the capacitor itself and is not needed as a component of the final capacitor product, a less expensive material can be used as compared to the anode lead tape. However, it is also to be understood that, in some embodiments, both the anode lead tape and carrier lead wire can be tantalum, both the anode lead tape and carrier lead wire can be non-tantalum, or the anode lead tape can be non-tantalum and the carrier lead wire can be tantalum.

Moreover, the embedded portion of the anode lead tape (as well as the external portion of the anode lead tape) can have a width that can be larger than at least the width or diameter of the second portion of the carrier lead wire. For instance, the embedded and external portions of the anode lead tape can have a width of from about 0.6 millimeters to about 12 millimeters. In addition, the width of the anode lead tape can be from about 25% to about 85% of the width of the surface of the porous anode body from which it extends (e.g., a front surface of the porous anode body), where the increased width compared to conventional anode lead wires serves to increase the points of contact between the anode lead tape and the porous anode body, which helps to reduce the ESR of the resulting capacitor. The embedded portion of the anode lead tape can also include one or more recesses or cavities, where such recesses or cavities also help to reduce the ESR of the resulting capacitor by further increasing the points of contact between the embedded portion of the anode lead tape and porous anode body. In other words, when the embedded portion of the anode lead tape has an increased width and can include one or more recesses and/or cavities, the area of contact between the embedded portion of the anode lead tape and the anode body is increased, thus reducing ESR by decreasing the resistance at the points of contact between the anode lead tape and the anode body.

However, as the width of an anode lead tape increases, the internal resistance of the anode lead tape also increases. Thus, in order to reduce the impact of the increased internal resistance of the embedded portion of the anode lead tape due to the increase in the width of the anode lead tape compared to conventional lead wires, the length of the external portion of the anode lead tape can be minimized, as can the width or diameter of the carrier lead wire. Thus, the external portion of the anode lead tape can have length of from about 200 micrometers to about 2.5 millimeters, while the second portion of the carrier lead wire can have a width or diameter of from about 50 micrometers to about 750 micrometers. Reducing the width or diameter of any external components of the anode lead assembly can further reduce the ESR of the resulting capacitor to limit the increase in internal resistance associated with larger width anode lead tapes. Moreover, using a carrier lead wire having a smaller width or diameter to carry the anodes during chemical processes such as anodization and cathode buildup can reduce material costs, as part of the second portion of the carrier lead wire is eventually trimmed away from the capacitor itself and is not needed as a component of the final capacitor product. Further, because the width or diameter of the carrier lead wire, as represented by the second portion of the carrier lead wire, can be less than the overall width of the anode lead tape, as represented by the embedded portion, various processing steps can be simplified because an anode lead having a smaller width or diameter is easier to manipulate than an anode lead tape having a larger width, and the overall stability of the anode lead assembly can be increased because there is less risk that the carrier lead wire will bend due to its smaller width or diameter when compared to the anode lead tape.

Various embodiments of the present invention will now be described in more detail.

I. Capacitor Element

The capacitor element of the present invention includes an anode, a dielectric layer, and a cathode, as well as optional additional layers, each of which are each described in more detail below.

A. Anode

The porous anode body of the capacitor of the present invention can typically be formed from a valve metal composition having a high specific charge, such as about 2000 $\mu F*V/g$ or more, in some embodiments about 5,000 $\mu F*V/g$ or more, in some embodiments about 10,000 $\mu F*V/g$ or more. For instance, such powders can have a specific charge of from about 10,000 to about 600,000 $\mu F*V/g$, in some embodiments from about 40,000 to about 500,000 $\mu F*V/g$, in some embodiments from about 70,000 to about 400,000 μF*V/g, in some embodiments from about 100,000 to about 350,000 μF*V/g, and in some embodiments, from about 150,000 to about 300,000 μF*V/g. As is known in the art, the specific charge may be determined by multiplying capacitance by the anodizing voltage employed, and then dividing this product by the weight of the anodized electrode body.

The valve metal composition contains a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05, For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H.C. Starck (e.g., NH175 nodular powder). Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Regardless of its particular composition, referring to FIGS. 1-5 and 6, the powder is compacted around an embedded portion 60 of an anode lead tape 34 so that an external portion 61 of the anode lead tape 34 extends from the compacted porous anode body 33, as discussed in more detail below. The anode lead tape can be a plate, film, sheet, paste, etc. having a width greater than its height. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the embedded portion 60 of the anode lead tape 34 may be embedded therein. The die may define a single or multiple slots that allow for the insertion of the anode lead. After filling the die with powder and embedding the anode lead tape therein, the die cavity may then be closed and subjected to compressive forces by a punch. Typically, the compressive forces are exerted in a direction that is either generally parallel or generally perpendicular to the length of the anode lead tape, which extends in the longitudinal direction axis (i.e., the z-axis in FIGS. 1-5 and 7). This forces the particles into close contact with the anode lead tape and creates a strong lead-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body is sintered to form a porous, integral mass. The pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

In the particular embodiments shown in FIGS. 1-7, the sintered, porous anode body 33 is in the shape of a rectangular pellet. In addition to having a rectangular shape, however, the anode can have a cubed, cylindrical, circular, or any other geometric shape. The anode may also be "fluted" in that it may contain one or more furrows, grooves, depressions, or indentations to increase the surface to volume ratio to minimize ESR and extend the frequency response of the capacitor. Such "fluted" anodes are described, for instance, in U.S. Pat. No. 6,191,936 to Webber et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Referring to FIGS. 1-7, the capacitor of the present invention can include a porous anode body 33 formed as discussed above in conjunction with an anode lead assembly 50 containing an anode lead tape 34 and a carrier lead wire 70, as discussed in more detail below. Generally, FIG. 1-6 show cross-sectional top views of several capacitor elements contemplated by the present invention, where the porous anode body 33 is formed around an embedded portion 60 of the anode lead tape 34, where an external portion 61 of the anode lead tape 34 is then joined to the carrier lead wire 70 external to the porous anode body 33. As shown in FIGS. 1-7, the porous anode body 33 (and capacitor element formed therefrom) can have a first side surface 31, a second side surface 32, a front surface 36, a rear surface 37, an upper surface 38, and a lower surface 39. In addition, the porous anode body 33 can have a width W that can refer, for example, to the width of the front surface 36 along the x-axis, a height H that can refer, for example, to the height or thickness of the front surface 36 along the y-axis, and a length L that can refer, for example, to the length of the upper surface 38 along the z-axis. The width W of the front surface 36 of the porous anode body 33 can range from about 1.5 millimeters to about 15 millimeters, in some embodiments, from about 1.75 millimeters to about 10 millimeters, and in some embodiments, from about 2 millimeters to about 5 millimeters. Additionally, the height H of the front surface 36 of the porous anode body 33 can range from about 300 micrometers to about 5 millimeters, in some embodiments from about 500 micrometers to about 4 millimeters, and in some embodiments from about 700 micrometers to about 3 millimeters. Further, the length L of the upper surface 38 of the porous anode body 33 can range from about 800 micrometers to about 15 millimeters, in some embodiments, from about 1 millimeter to about 10 millimeters, and in some embodiments, from about 1.2 millimeters to about 5 millimeters.

B. Dielectric

Although not shown, it is to be understood that a dielectric overlies or coats the porous anode body. The dielectric may be formed by anodically oxidizing ("anodizing") the sintered anode so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping the anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode body. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode body and within its pores.

C. Solid Electrolyte

The capacitor element also contains a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, the solid electrolyte may be formed from one or more conductive polymer layers. The conductive polymer(s) employed in such can be π-conjugated and have electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

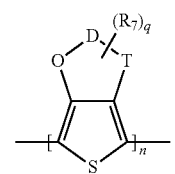

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

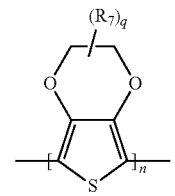

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

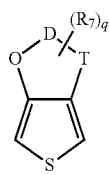

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are also suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst typically includes a transition metal cation, such as iron(III), copper(II), chromium(VI), cerium(IV), manganese (IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $O_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the anode part. Suitable application techniques that may include screen-printing, dipping, electrophoretic coating, and spraying may be used to form a conductive polymer coating. As an example, the monomer may initially be mixed with the oxidative catalyst to form a precursor solution. Once the mixture is formed, it may be applied to the anode part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer.

Polymerization may be typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, a conductive polymer layer may also be applied in the form of a dispersion of conductive polymer particles. Although the particle size may vary, it is typically desired that the particles possess a small diameter to increase the surface area available for adhering to the anode part. For example, the particles may have an average diameter of from about 1 nanometer to about 500 nanometers, in some embodiments from about 5 nanometers to about 400 nanometers, and in some embodiments, from about 10 nanometers to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymer into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2000, to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers to about 50 micrometers, in some embodiments from about 0.5 micrometers to about 20 micrometers, and in some embodiments, from about 1 micrometer to about 5 micrometers. It should be understood that the thickness of the coating is not necessarily the same at all locations on the anode part. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

D. Additional Layers

Although not required, an external polymer coating may also be applied to the anode body and overlie the solid electrolyte. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in any optional dispersions of the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 50 nanometers to about 500 nanometers, in some embodiments from about 80 nanometers to about 250 nanometers, and in some embodiments, from about 100 nanometers to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent may be typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 micrometer to about 50 micrometers, in some embodiments from about 2 micrometers to about 40 micrometers, and in some embodiments, from about 5 micrometers to about 20 micrometers.

If desired, the capacitor may also contain other layers. For example, a protective coating may optionally be formed between the dielectric and solid electrolyte, such as one made of a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1 \times 10^5$ Ω·cm, and in some embodiments, greater than about $1 \times 10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

II. Anode Lead Assembly

As discussed above, the electrolytic capacitor of the present invention includes an anode lead tape and a carrier lead wire that form an anode lead assembly. The anode lead tape can have an embedded portion that is embedded within the porous anode body and an external portion that extends from a surface thereof in a longitudinal direction. Meanwhile, the carrier lead wire is not embedded within the porous anode body and has a first portion that is in contact with the external portion of the anode lead tape and a second portion that is in contact with an anode termination. The anode lead tape and carrier lead wire may be formed from any electrically conductive material, such as tantalum, niobium, nickel, aluminum, hafnium, titanium, stainless steel, etc., as well as alloys, oxides, and/or nitrides of thereof. For instance, in some embodiments, the anode lead tape can be tantalum and the carrier lead wire can be stainless steel, nickel, or a nickel alloy, which can help reduce the cost of the anode lead assembly. In one particular embodiment, the carrier lead wire can be formed of NILO®, which is a nickel-iron alloy. Although in some embodiments the anode lead tape is formed from tantalum and the carrier lead wire can be formed from a non-tantalum material, it should be understood that the anode lead tape and the carrier lead wire can be formed from the same material (e.g., tantalum) in other embodiments.

Figure 5:
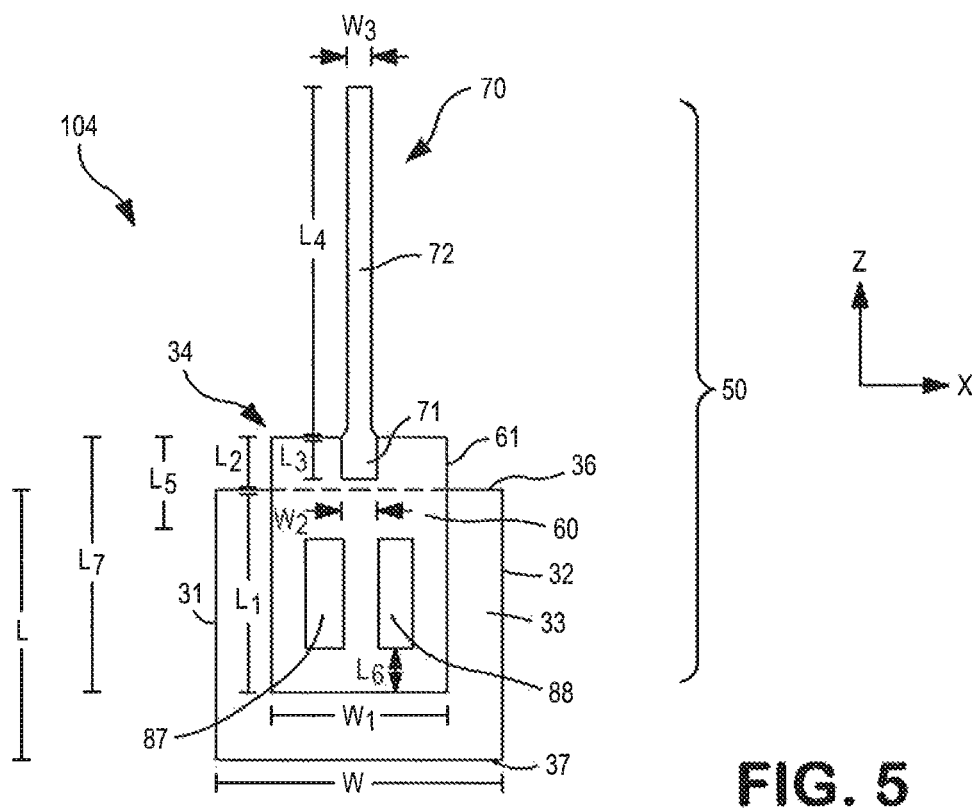
FIG. 5 is a cross-sectional top view of one embodiment of an electrolytic capacitor element of the present invention.
Figure 6:
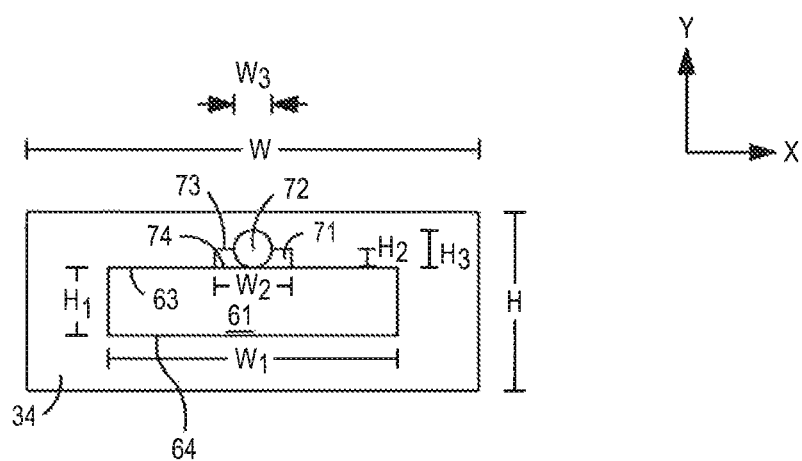
FIG. 6 is a cross sectional view of the capacitor element of FIG. 1, as taken from the cut line C in FIG. 1.

The anode lead tape can have a generally rectangular, standard oval, racetrack (e.g., elongated) oval, elliptical, or any other shape as long as its width W1 in the x-direction (transverse direction) is generally greater than its thickness or height H1 in the y-direction such that it is in the form of a lead tape, as shown in FIG. 6 in more detail. For instance, the ratio of the width W1 to the height H1 of the anode lead tape 34 can range from about 1.5 to about 10, such as from about 1.75 to about 7.5, such as from about 2 to about 5. Moreover, the width W1 of the anode lead tape 34 can be from about 25% to about 85%, such as from about 30% to about 80%, such as from about 35% to about 75% of the width W of the porous anode body 33. In one particular embodiment, the width W1 of the anode lead tape 34 can be from about 50% to about 70% of the width W of the porous anode body. Referring to FIGS. 1-5, the anode lead tape 34 can have a width W1 ranging from about 600 micrometers to about 12 millimeters, such as from about 800 micrometers to about 10 millimeters, such as from about 1 millimeter to about 8 millimeters. Further, as shown in FIG. 6, the anode lead tape 34 can have a height H1 ranging from about 200 micrometers to about 800 micrometers, such as from about 225 micrometers to about 700 micrometers, such as from about 250 micrometers to about 600 micrometers. Further, referring to FIGS. 1-5, the embedded portion 60 of the anode lead tape 34 can have a length L1 ranging from about 200 micrometers to about 13.5 millimeters, such as from about 250 micrometers to about 9 millimeters, such as from about 300 micrometers to about 4.5 millimeters. In other words, the embedded portion 60 of the anode lead tape 34 can have a length L1 that is from about 25% to about 90%, such as from about 30% to about 80%, such as from about 40% to about 75% of the length L of the upper surface 38 of the porous anode body 33. Meanwhile, the external portion 61 of the anode lead tape 34 can have a length L2 ranging from about 200 micrometers to about 2.5 millimeters, such as from about 250 micrometers to about 2 millimeters, such as from about 300 micrometers to about 1.5 millimeters. The length L2 of the external portion 61 of the anode lead tape 34 is minimized to reduce the ESR of the capacitor that can be attributed to the increased internal resistance of the first external portion 61 of the anode lead tape 34 due to its larger width W1 as compared to the carrier lead wire 70 and to enhance the stability of the lead assembly 50 by reducing the risk of bending due to the weight of the anode lead tape 34. In any event, the anode lead tape 34 can have a length L7, which is the sum of the length L1 of the embedded portion 60 and the length L2 of the external portion 62 ranging from about 400 micrometers to about 16 millimeters, such as from about 500 micrometers to about 11 millimeters, such as from about 600 micrometers to about 6 millimeters.

In addition, the carrier lead wire may possess any desired cross-sectional shape, such as circular, elliptical, square, rectangular, triangular, trapezoidal, standard oval, racetrack oval, etc., or a combination thereof. In one particular embodiment, the embedded portion and external portion of the anode lead tape can have a generally rectangular or racetrack oval shape such that the upper and lower surface of the external portion of the anode lead tape is substantially planar, while the first portion of the carrier lead wire can be a standard oval or racetrack oval shape having a substantially planar lower and upper surface and the second portion of the carrier lead wire can be circular, where the difference in shape is due to flattening, crimping, compressing, or otherwise altering the shape of the first portion of the carrier lead wire to create a substantially planar surface, where the substantially planar surfaces of the external portion of the anode lead tape and the first portion of the carrier lead wire are connected together as discussed in more detail below. In such embodiments and referring to FIGS. 1-6, the first portion 71 of the carrier lead wire 70 can have a width W2 of from about 60 micrometers to about 1 millimeter, such as from about 80 micrometers to about 800 micrometers, such as from about 120 micrometers to about 600 micrometers. In addition, the first portion 71 of the carrier lead wire 70 can have a height H2 of from about 25 micrometers to about 500 micrometers, such as from about 50 micrometers to about 400 micrometers, such as from about 75 micrometers to about 300 micrometers. Further, the first portion 71 of the carrier lead wire 70 can have a length L3 of from about 20 micrometers to about 2.25 millimeters, such as from about 25 micrometers to about 1.8 millimeters, such as from about 30 micrometers to about 1.35 millimeters. In other words, the first portion 71 of the carrier lead wire 70 can have a length L3 that is from about 10% to about 90%, such as from about 20% to about 80%, such as from about 30% to about 70% of the length L2 of the external portion 61 of the anode lead tape 34, which corresponds to the portion of the carrier lead wire 70 that is welded to the external portion 61 of the anode lead tape 34.

Furthermore, as shown in FIGS. 1-7, due to the flattening of the first portion 71 of the carrier lead wire 70, the first portion 71 of the carrier lead wire 70 can have a decreased height and increased width compared to the second portion 72 of the carrier lead wire 70. As such, the second portion 72 of the carrier lead wire 70 can have a height H3 of from about 30 micrometers to about 450 micrometers, such as from about 60 micrometers to about 350 micrometers, such as from about 90 micrometers to about 250 micrometers. In addition, the second portion 72 of the carrier lead wire 70 can have a width W3 of from about 50 micrometers to about 750 micrometers, such as from about 75 micrometers to about 625 micrometers, such as from about 100 micrometers to about 500 micrometers. Further, when the carrier lead wire 70 is circular, it should be noted that the width W3 and height H3 of the second portion 72 of the carrier lead wire 70 are the same and can represent its diameter. The reduced height/thickness or diameter H3 of the second portion 72 of the carrier lead wire 70 compared to the height H1 of anode lead tape 34 can lead to a reduced ESR and can also reduce the amount of energy required to connect the anode lead assembly 50 to an anode termination 35. Likewise, the reduced width or diameter W3 of the second portion 72 of the carrier lead wire 70 compared to the width W1 of the anode lead tape 34 can significantly reduce the amount of energy required to connect the anode lead assembly 50 to an anode termination 35. Additionally, the second portion 72 of the carrier lead wire 70 can have a pre-trimmed length L4 of from about 1 millimeter to about 50 millimeters, such as from about 2.5 millimeters to about 40 millimeters, such as from about 5 millimeters to about 30 millimeters, while the length L4 can be reduced by trimming upon further assembly of the capacitor depending on the arrangement of the anode termination 35 and anode body 33 inside a casing. In other words, after trimming, the total length L3+L4 can vary based on the particular design of the capacitor and the location of the anode termination 35 as the second portion 72 of the second anode lead 70 must extend at least to the anode termination 35 for welding thereto.

Regardless of the specific dimensions of the anode lead assembly components, the combination of the larger width anode lead tape and the smaller width or diameter carrier lead wire can synergistically reduce the ESR and leakage current (DCL) of the resulting capacitor. For instance, because the embedded portion of the anode lead tape can have a larger width to increase the points of contact between the anode lead tape and the anode body, the resistance at the points of contact between the anode lead tape and the anode body is reduced. In addition, while the external portion of the anode lead tape has the same width as the embedded portion of the anode lead tape, the external portion generally extends only a small distance from a surface of the anode body to minimize the length of the first external portion of the anode lead tape having a larger width, which, in turn, can minimize the effect of the increased internal resistance in the anode lead tape. Meanwhile, the first portion of the carrier lead wire, which is connected to the external portion of the anode lead tape, and the second portion of the carrier lead wire, which can be used to form an electrical connection with an anode termination, have a smaller width or diameter as compared to the width of the anode lead tape, which significantly minimize the amount of energy (for instance, laser energy) needed for contacting/welding to the anode termination 35. Therefore, the leakage current of the final capacitor is reduced and the assembly yield is improved.

Turning now to FIGS. 1-5, the various embodiments of the embedded portion 60 of the anode lead tape 59 of the anode lead assembly 50 are discussed in more detail. First, as shown in FIG. 1, the present invention contemplates a capacitor element 100 where the embedded portion 60 of the anode lead tape 34 has a uniform shape across its width W1 and length L1. In other words, the embedded portion 60 of the anode lead tape 59 is substantially solid with no recesses or cavities formed therein.

Figure 2:
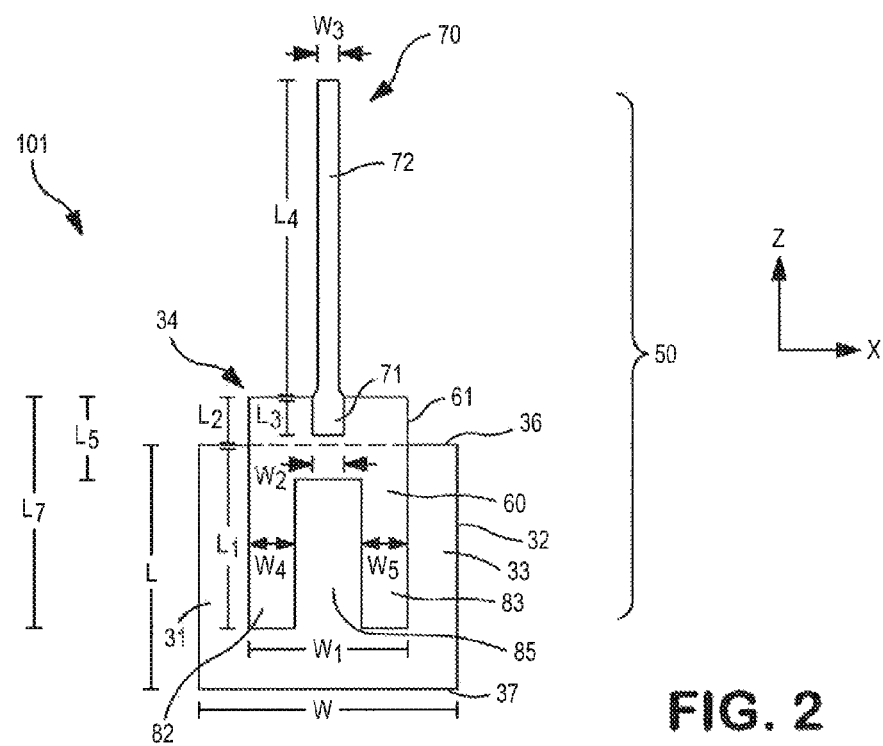
FIG. 2 is a cross-sectional top view of one embodiment of an electrolytic capacitor element of the present invention.

Next, in FIG. 2, a capacitor element 101 is contemplated that includes an anode lead tape 34 where the embedded portion 60 is not solid across its width W1 and length L1. Instead, to further increase the points of contact between the embedded portion 60 of the anode lead tape 34 and the porous anode body 33, the embedded portion 60 of the anode lead tape 34 of capacitor element 101 is provided with a recess 85 such that the embedded portion of the anode lead tape 34 has a reduced width W4 extending from the recess 85 to the first side surface of the anode body 33 and a reduced width W5 extending from the recess 85 to the second side surface of the anode body 33. The embedded portion 60 of the anode lead tape 34 is free from anode lead tape material (e.g., tantalum) at the recess 85 due to any suitable means of removing the anode lead tape material at the recess 85 after the anode lead tape 34 is formed (e.g., cutting) or due to forming anode lead tape 34 such that it includes the recess 85 in the first instance. The recess 85 can be centrally located across the width W1 of the embedded portion 60 of the anode lead tape 34 in the x-direction (transverse direction) such that the embedded portion 60 of the anode lead tape 34 has an n-shaped appearance where the embedded portion 60 of the anode lead tape 34 is defined by a first projection 82 and a second projection 83 that extend in the longitudinal direction towards a rear surface 37 of the anode body 33. However, it is also to be understood that the recess 85 can be formed in any suitable location of the embedded portion 60 of the anode lead tape 34, such as along the z-direction (longitudinal) instead of the x-direction, such that the first projection 82 and the second projection 83 extend towards the first side surface 31 or the second side surface 32 of the anode body 33. In any event, as a result of the recess 85 and as shown in FIG. 2, each width W4 and W5 of the embedded portion 60 of the anode lead tape 34 can range from about 10% to about 90%, such as from about 15% to about 70%, such as from about 20% to about 50% of the width W1 of the anode lead tape 34. For example, in some embodiments, each width W4 and W5 can range from about 60 micrometers to about 10.8 millimeters, such as from about 80 micrometers to about 9 millimeters, such as from about 100 micrometers to about 7.2 millimeters. Further, after the recess 85 is formed in the embedded portion 60 of the anode lead tape 34, the length L5 of the lead tape 34 in which no recess 85 is formed and that extends from the recess 85 towards the front surface 36 of the anode body 33 and towards the carrier wire 70 is from about 20% to about 90%, such as from about 25% to about 75%, such as from about 30% to about 50%, of the entire length L7 of the anode lead tape 34. For instance, the length L5 can range from about 80 micrometers to about 15 millimeters, such as from about 100 micrometers to about 10 millimeters, such as from about 120 micrometers to about 5 millimeters.

Figure 3:
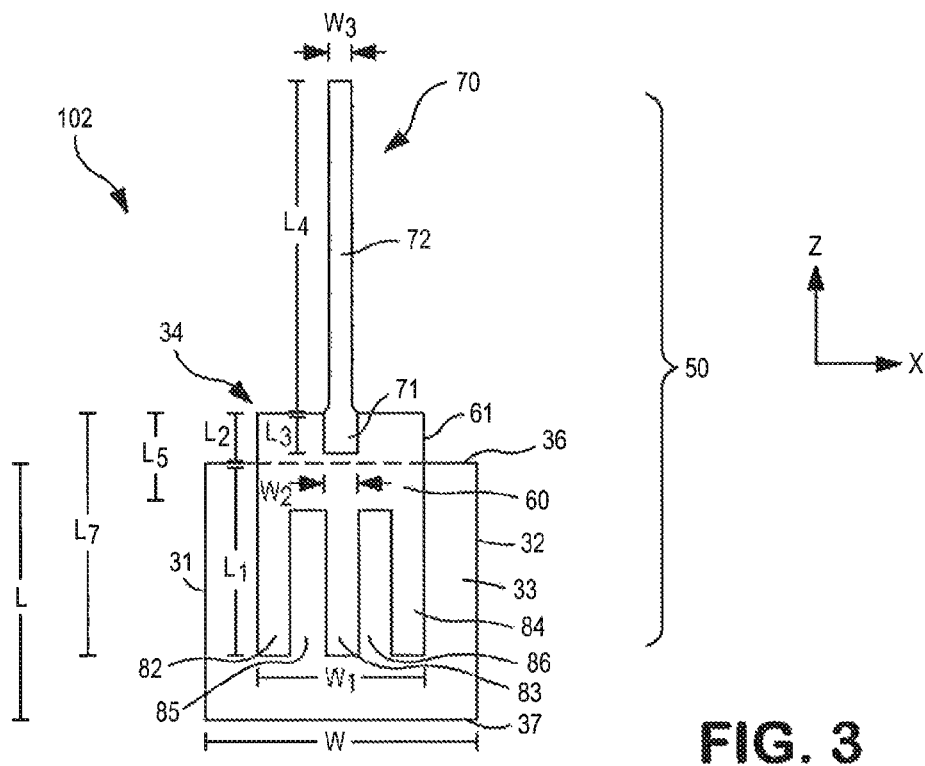
FIG. 3 is a cross-sectional top view of one embodiment of an electrolytic capacitor element of the present invention.

In addition, in FIG. 3, another capacitor element 102 is contemplated that includes an anode lead tape 34 where the embedded portion 60 is not solid across its width W1 and length L1. Instead, as in the capacitor element 101 of FIG. 2, to further increase the points of contact between the embedded portion 60 of the anode lead tape 34 and the porous anode body 33, the embedded portion 60 of the anode lead tape 34 of capacitor element 102 is provided with a first recess 85 and a second recess 86. The embedded portion 60 of the anode lead tape 34 is free from anode lead tape material (e.g., tantalum) at the first recess 85 and the second recess 86 due to any suitable means of removing the anode lead tape material at the first recess 85 and the second recess 86 after the anode lead tape 34 is formed (e.g., cutting) or due to forming the anode lead tape 34 such that it includes the recesses in the first instance. The first recess 85 and the second recess 86 can be evenly spaced across the width W1 of the embedded portion 60 of the anode lead tape 34 in the x-direction (transverse direction) such that the embedded portion 60 of the anode lead tape 34 has an m-shaped appearance, where the embedded portion 60 of the anode lead tape 34 is defined by a first projection 82, a second projection 83, and a third projection 84 that extend in the longitudinal direction towards a rear surface 37 of the anode body 33. However, it is also to be understood that the first recess 85 and the second recess 86 can be formed in any suitable location of the embedded portion 60 of the anode lead tape 34, such as along the z-direction (longitudinal) instead of the x-direction, such that the first projection 82, the second projection 83, and the third projection 84 extend towards the first side surface 31 or the second side surface 32 of the anode body.

Further, although FIGS. 2 and 3 show capacitor elements 101 and 102 having one recess and two recesses, respectively, formed in the embedded portion 60 of the anode lead tape 34 of the present invention, it is to be understood that the present invention contemplates that any suitable number of recesses can be formed in the embedded portion 60 of the anode lead tape 34, such as three, four, five, or even six recesses.

Figure 4:
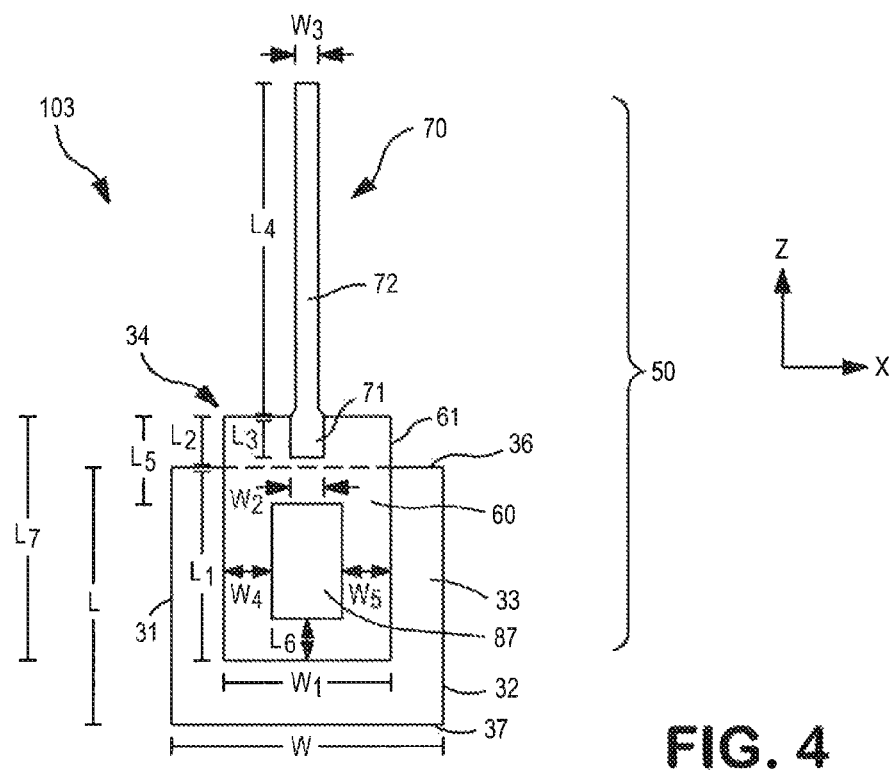
FIG. 4 is a cross-sectional top view of one embodiment of an electrolytic capacitor element of the present invention.

Turning now to FIG. 4, yet another capacitor element 103 is contemplated that includes an anode lead tape 34 where the embedded portion 60 is not solid across its width W1 and length L1. Instead, to further increase the points of contact between the embedded portion 60 of the anode lead tape 34 and the porous anode body 33, the embedded portion 60 of the anode lead tape 34 of capacitor element 103 is provided with a cavity 87 such that the embedded portion of the anode lead tape 34 has a reduced width W4 extending from the cavity 87 to the first side surface of the anode body 33 and a reduced width W5 extending from the recess 85 to the second side surface of the anode body 33, as discussed above with respect to the capacitor element 101 having a recess 85. The embedded portion 60 of the anode lead tape 34 is free from anode lead tape material (e.g., tantalum) at the cavity 87 due to any suitable means of removing the lead tape material at the cavity 87 after the anode lead tape 34 is formed (e.g., cutting) or due to forming the anode lead tape 34 such that it includes the cavity 87 in the first instance. The cavity 87 can be centrally located across the width W1 of the embedded portion 60 of the anode lead tape 34 in the x-direction (transverse direction) and the length L1 of the embedded portion 60 of the anode lead tape 34 in the z-direction such that the embedded portion 60 of the anode lead tape 34 includes a centrally located hollow section along its height H1 that is completely surrounded or framed by the embedded portion 60 of the anode lead tape 34. Further, after the cavity 87 is formed in the embedded portion 60 of the anode lead tape 34, the length L5 of the lead tape 34 in which no cavity 87 is formed and that extends from the cavity 87 towards the front surface 36 of the anode body 33 and towards the carrier wire 70 is from about 20% to about 90%, such as from about 25% to about 75%, such as from about 30% to about 50%, of the entire length L7 of the anode lead tape 34. For instance, the length L5 can range from about 80 micrometers to about 15 millimeters, such as from about 100 micrometers to about 10 millimeters, such as from about 120 micrometers to about 5 millimeters. Moreover, as a result of the formation of the cavity 87, the anode lead tape 34 can have a length L6 that extends from the cavity 87 towards the rear surface 37 of the anode body 33 that can range from about 10% to about 70%, such as from about 15% to about 60%, such as from about 20% to about 50% of the entire length L7 of the anode lead tape 34. For example, the length L6 can range from about 40 micrometers to about 12 millimeters, such as from about 50 micrometers to about 7 millimeters, such as from about 60 micrometers to about 3.5 millimeters.

In addition, as shown in FIG. 5, the present invention contemplates still another capacitor element 104 that includes an anode lead tape 34 where the embedded portion 60 is not solid across its width W1 and length L1. Instead, to further increase the points of contact between the embedded portion 60 of the anode lead tape 34 and the porous anode body 33, the embedded portion 60 of the anode lead tape 34 of capacitor element 104 is provided with a first cavity 87 and a second cavity 88. The embedded portion 60 of the anode lead tape 34 is free from anode lead tape material (e.g., tantalum) at the first cavity 87 and the second cavity 88 due to any suitable means of removing the lead tape material at the first cavity 87 and the second cavity 88 after the anode lead tape 34 is formed (e.g., cutting) or due to forming the lead tape material such that it includes the first cavity 87 and the second cavity 88 in the first instance. The first cavity 87 and the second cavity 88 can be evenly spaced across the width W1 of the embedded portion 60 of the anode lead tape 34 in the x-direction (transverse direction) and the length L1 of the embedded portion 60 of the anode lead tape 34 in the z-direction such that the embedded portion 60 of the anode lead tape 34 includes two symmetrical hollow sections along its height H1 that are each completely surrounded or framed by anode lead tape material.

Further, although FIGS. 4 and 5 show capacitor elements 103 and 104 having one cavity and two cavities, respectively, formed in the embedded portion 60 of the anode lead tape 34 of the present invention, it is to be understood that the present invention contemplates that any suitable number of cavities can be formed in the embedded portion 60 of the anode lead tape 34, such as three, four, five, or even six cavities.

In addition to contemplating an anode lead assembly 50 that can include various recesses and/or cavities in the embedded portion 60 of the anode lead tape 34, it should be understood that the present invention also contemplates an anode lead assembly 50 that can have various configurations depending on where the carrier lead wire 70 is connected to the external portion 61 of the anode lead tape 34. For example, in FIG. 6, which is a cross-sectional view of the capacitor element 100 of FIG. 1 from cut line C, an upper surface 63 of the external portion 61 of the anode lead tape 34 is in contact with a lower surface 74 of the first portion 71 of the carrier lead wire 70. On the other hand, in other embodiments (not shown), a lower surface 64 of the external portion 61 of the anode lead tape 34 can be in contact with an upper surface 73 of the first portion 71 of the carrier lead wire 70. In still other embodiments, it is to be understood that any surface of the external portion 61 of the anode lead tape 34 can be connected to any surface of the first portion 71 of the carrier lead wire 70. In any event, the carrier lead wire 70 can extend from the external portion 61 of the anode lead tape 34 in a longitudinal or z-axis direction as shown in FIGS. 1-5. Further, the first portion 71 of the carrier lead wire 70 can be connected to the external portion 62 of the anode lead tape 34 by any suitable method such as by resistance welding, laser welding, or a conductive adhesive. Referring to FIG. 6, in one particular embodiment, for instance, the external portion of the anode lead tape 61 and the first portion of the carrier lead wire 71 are connected by resistance welding a substantially planar lower surface 74 of the first portion of the carrier lead wire 71 to a substantially planar upper surface 63 of external portion of the anode lead tape 61.

Figure 7:
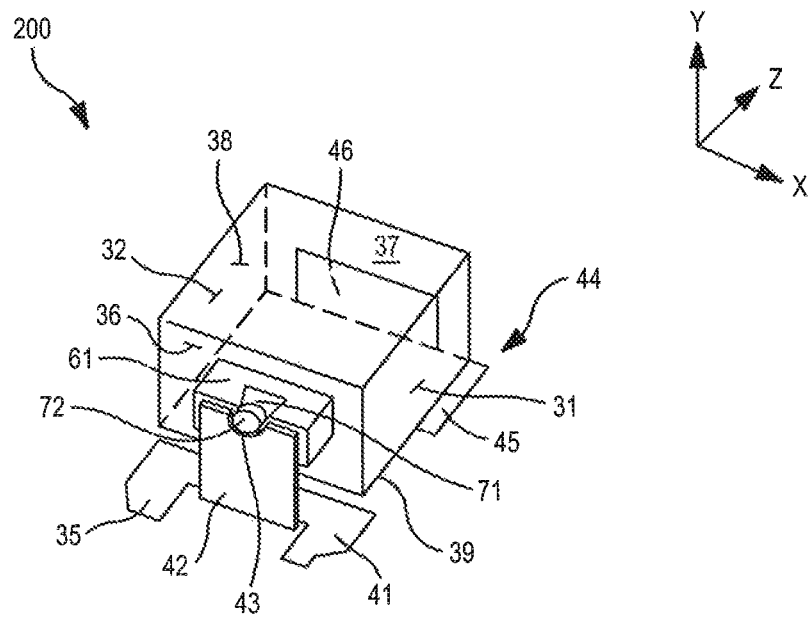
FIG. 7 is a perspective view of one embodiment of the solid electrolytic capacitor of the present invention.

Regardless of the particular design or manner in which the capacitor elements 100 to 104 are formed, each capacitor element can be connected to terminations as is well known in the art. For example, anode and cathode terminations may be electrically connected to the second anode lead and the cathode, respectively. The specific configuration of the terminations may vary as is well known in the art. Although not required, as shown in FIG. 7, for example, the cathode termination 44 can contain a planar portion 45 in electrical contact with a lower surface 39 of the capacitor element and an upstanding portion 46 positioned substantially perpendicular to the planar portion 45 and in electrical contact with a rear surface 37 of the capacitor element in the capacitor 200 of FIG. 7. To attach the capacitor to the cathode termination, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osaka, et al., which is incorporated herein in its entirety by reference thereto for all purposes.

Referring again to FIG. 7, although not required, the anode termination 35 may likewise contain a planar portion 41 and an upstanding portion 42. The upstanding portion 42 may contain a region that carries the second portion 72 of the carrier lead wire 70 of the present invention. For example, the region may possess a slot 43 for receiving the second portion 72 of the carrier lead wire 70. The slot may have any desired shape, and can be U-shaped, V-shaped, circular, elliptical, oval, rectangular, square, stepped, etc. for further enhancing surface contact and mechanical stability of the second portion 72 of the carrier lead wire 70 at the anode termination 35. For instance, the geometry of the slot 43 may match the geometry of the second portion 72 of the carrier lead wire 70. The second portion 72 of the carrier lead wire 70 can be electrically connected to the anode termination 35 by any suitable technique, such as by laser welding, by resistance welding, or the use of conductive adhesives, etc. In one particular embodiment, a laser beam can be used to laser weld the second portion 72 of the carrier lead wire 70 to the anode termination 35 at slot 43. Regardless of the particular welding technique used to connect the second portion 72 of the carrier lead wire 70 to the anode termination 35, the amount of energy required to form a sufficient weld is reduced when compared to the amount of energy that would be required if the larger thickness/height or diameter external portion 61 of the anode lead tape 34 was directly connected to the anode termination 35. Thus, by utilizing a smaller carrier lead wire 70 to serve as the direct connection to the anode termination 35, the benefit of embedding a relatively thick embedded portion 60 of the anode lead tape 34 in the porous anode body 33 can still be realized (i.e., improved contact with the porous anode body to reduce ESR), yet the welding process to form an electrical connection with an anode termination 35 can be carried out in a more efficient and cost-effective manner due to the reduced thickness/height or diameter of the second anode lead 70, particularly at second portion 72.

Figure 8:
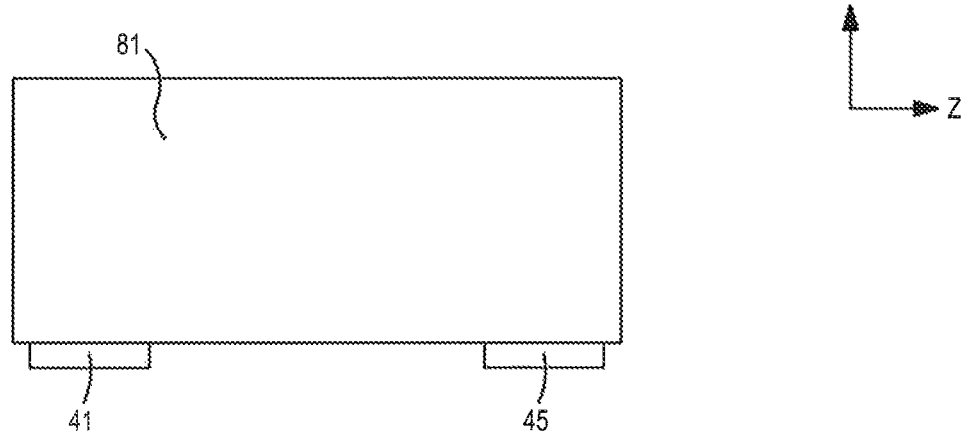
FIG. 8 is a perspective view of the solid electrolytic capacitor of FIG. 7 in its resin casing.

Further, once the capacitor element is formed and is attached to the terminations as discussed above, and once the excess length, if any, of the second portion 72 of the second anode lead 70 is trimmed, the capacitor element and anode lead assembly can be enclosed within a resin casing 81, as shown in FIG. 8, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 100 micrometers to about 2.5 millimeters, and in some embodiments, from about 150 micrometers to about 2.0 millimeters. Suitable casings may include, for instance, "A", "B", "H", or "T" cases (AVX Corporation). After encapsulation, exposed portions of the respective anode and cathode terminations may be aged, screened, and trimmed. If desired, the exposed portions may be optionally bent twice along the outside of the casing (e.g., at an approximately 90° angle).

As a result of the present invention, a capacitor may be formed that exhibits excellent electrical properties as determined by the test procedures described below. For example, the capacitor of the present invention can exhibit an ultralow ESR, such as about 300 milliohms (mΩ) or less, in some embodiments about 100 mΩ or less, in some embodiments from about 0.01 mΩ to about 50 mΩ, and in some embodiments, from about 0.1 mΩ to about 20 mΩ, determined at a frequency of 100 kHz and a temperature of 23° C.±2° C. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 μA/μF*V, in some embodiments less than about 0.01 μA/μF*V, and in some embodiments, less than about 0.001 μA/μF*V, wherein μA is microamps and μF*V is the product of the capacitance and the rated voltage.

Test Procedures

Equivalent Series Resistance ("ESR")

ESR generally refers to the extent that the capacitor acts like a resistor when charging and discharging in an electronic circuit and is usually expressed as a resistance in series with the capacitor. ESR is typically measured using a Keithley 3330 Precision LCZ meter with Kelvin Leads 2.2 volt DC bias and a 0.5 volt peak to peak sinusoidal signal, at an operating frequency of 100 kHz and temperature of 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Dissipation Factor

The dissipation factor was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current

Leakage current ("DCL") was measured using a leakage test set that measures leakage current at a temperature of 23° C.±2° C. and at the rated voltage after a minimum of 60 seconds.

Laser Weld

The laser weld was done using a Trumpf Nd:YaG HAAS laser (emitting near IR light at wavelength around 1,064 nanometers). The energy to weld generally refers to the amount of laser energy required to bond the anode lead to the anode termination component of a leadframe. The energy to weld is measured in Joules.

Example 1

70,000 μFV/g tantalum powder was pressed into a pellet to form a porous body having a length of 1.8 mm, a width of 2.4 mm, and a thickness of 1.2 mm. The tantalum powder was charged into the hopper of a tantalum device automatic molding machine and automatically molded together with a tantalum plate having a width of 1.35 mm and a thickness of 0.35 mm and pressed to a density of 6.8 g/cm$^3$ to manufacture a porous body with as shown in FIG. 1. The penetration of wire in the porous body was 75% of the anode length. This molded body was left standing under reduced pressure at 1300° C. to obtain a sintered body.

A carrier tantalum wire having a diameter of 0.19 mm was then welded together with the tantalum plate by a resistance welding process. Thereafter, the carrier wire (the 0.19 mm diameter tantalum wire) was welded to an auxiliary stainless steel strip.

The tantalum anode was anodized at 13 V in a liquid electrolyte of 0.1% phosphoric acid to make capacitors with 150 μF at 120 Hz. A conductive polymer coating was then formed by dipping the anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The anode was washed in methanol to remove reaction by-products, anodized in a liquid electrolyte, and washed again in methanol. This process was repeated 12 times. The part was then dipped into a graphite dispersion and dried. Finally, the part was dipped into a silver dispersion and dried. The finished part was completed by conventional assembly technology. A copper-based leadframe was used for finishing of the assembly process. Once the capacitor element was attached to the cathode termination, the anode lead wire was attached to the anode termination via a laser welding process. Next, the leadframe was enclosed with an encapsulating epoxy resin. Multiple parts (50) of 150 μF/6.3V capacitors were made in this manner.

Example 2

Capacitors were formed in the manner described in Example 1, except that the tantalum powder was molded together with a tantalum plate having a width of 1.35 mm and a thickness of 0.35 mm and pressed to a density of 6.8 g/cm$^3$ to manufacture a porous body as shown in FIG. 2. Multiple parts (50) were made in this manner.

Example 3

Capacitors were formed in the manner described in Example 1, except that the tantalum powder was molded together with a tantalum plate having a width of 1.35 mm and a thickness of 0.35 mm and pressed to a density of 6.8 g/cm$^3$ to manufacture a porous body as shown in FIG. 4. Multiple parts (50) were made in this manner.

Comparative Example 4

Capacitors were formed in the manner described in Example 1, except that only a tantalum lead wire with a diameter of 0.19 mm was molded and pressed to a density of 6.8 g/cm$^3$ to manufacture a porous body. Multiple parts (250) were made in this manner.

Table 1 below summarizes the characteristics of examples discussed above, including the tantalum wire diameters, the laser weld setting, the median DCL, the median capacitance, the median dissipation factor, and the median ESR of the finished capacitors.

TABLE 1

|  | Carrier Ta wire diameter [mm] | Ta plate ref. | DCL [μA] | CAP [μF] | Df | ESR [mΩ] |
| --- | --- | --- | --- | --- | --- | --- |
| Example 1 | 0.19 | FIG. 1 | 34.2 | 144.3 | 1.8 | 16.8 |
| Example 2 | 0.19 | FIG. 2 | 21.4 | 152.1 | 2.1 | 19.4 |
| Example 3 | 0.19 | FIG. 4 | 32.6 | 155.9 | 2.2 | 18.5 |
| Comparative Example 4 | — | — | 8.1 | 160.6 | 1.9 | 36.2 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor, the solid electrolytic capacitor comprising:
    a capacitor element, wherein the capacitor element comprises a sintered, porous anode body; a dielectric layer overlying the sintered, porous anode body; and a cathode overlying the dielectric layer that includes a solid electrolyte; and
    an anode lead assembly, wherein the anode lead assembly comprises an anode lead tape having an embedded portion positioned within the sintered, porous anode body and an external portion extending from a surface of the sintered, porous anode body in a longitudinal direction, wherein the anode lead tape has a width and a height, wherein the ratio of the width of the anode lead tape to the height of the anode lead tape is from about 1.5 to about 10; and a carrier lead wire positioned external to the sintered, porous anode body, wherein the carrier lead wire comprises a first portion and a second portion, wherein the first portion has a width that is greater than a diameter of the second portion, wherein the first portion has a substantially planar surface, wherein the substantially planar surface of the first portion of the carrier lead wire is connected to the external portion of the anode lead tape, and wherein the width of the first portion of the carrier lead wire is smaller than the width of the anode lead tape.

2. The solid electrolytic capacitor of claim 1, wherein the sintered, porous anode body has a width, wherein the width of the anode lead tape is from about 25% to about 85% of the width of the sintered, porous anode body.

3. The solid electrolytic capacitor of claim 1, wherein the embedded portion of the anode lead tape includes one or more recesses.

4. The solid electrolytic capacitor of claim 1, wherein the embedded portion of the anode lead tape includes one or more hollow cavities.

5. The solid electrolytic capacitor of claim 1, wherein the anode lead tape is generally rectangular or has a racetrack oval shape.

6. The solid electrolytic capacitor of claim 1, wherein the second portion of the carrier lead wire is generally circular.

7. The solid electrolytic capacitor of claim 6, wherein the diameter of the second portion of the carrier lead wire is less than the width of the anode lead tape.

8. The solid electrolytic capacitor of claim 1, wherein the substantially planar surface of the first portion of the second anode lead is connected to the external portion of the anode lead tape by resistance welding.

9. The solid electrolytic capacitor of claim 1, further comprising an anode termination, wherein the second portion of carrier lead wire is connected to the anode termination by laser welding.

10. The solid electrolytic capacitor of claim 1, further comprising a cathode termination that is electrically connected to the cathode.

11. The solid electrolytic capacitor of claim 1, wherein the anode body is formed from a powder comprising tantalum, niobium, aluminum, hafnium, titanium, an electrically conductive oxide thereof, or an electrically conductive nitride thereof.

12. A method for forming a solid electrolytic capacitor, the method comprising:
    positioning an anode lead tape within a powder formed from a valve metal composition such that the anode lead tape includes an embedded portion located within a porous anode body and an external portion extending from a surface of the porous anode body in a longitudinal direction, wherein the anode lead tape has a width and a height, wherein the ratio of the width of the anode lead tape to the height of the anode lead tape is from about 1.5 to about 10;
    compacting the powder around the embedded portion of the anode lead tape;
    sintering the compacted powder to form a sintered, porous anode body;
    positioning a carrier lead wire external to the sintered, porous anode body, wherein the carrier lead wire comprises a first portion and a second portion, wherein the first portion has a width that is greater than a width of the second portion, wherein the first portion includes a substantially planar surface, and wherein the width of the first portion of the carrier lead wire is smaller than the width of the anode lead tape;
    connecting the substantially planar surface of the first portion of the carrier lead wire to the external portion of the anode lead tape; and
    connecting the second portion of the carrier lead wire to an anode termination to form an electrical connection between the second portion of the carrier lead wire and the anode termination.

13. The method of claim 12, further comprising trimming excess anode lead material from the carrier lead wire after welding the second portion of the carrier lead wire to the anode termination.

14. The method of claim 12, wherein the sintered, porous anode body has a width, wherein the width of the anode lead tape is from about 25% to about 85% of the width of the sintered, porous anode body.

15. The method of claim 12, further comprising forming one or more recesses or hollow cavities in the embedded portion of the anode lead tape.

16. The method of claim 12, wherein the second portion of the carrier lead wire is circular, wherein the diameter of the second portion of the carrier lead wire is less than the width of the anode lead tape.

17. The method of claim 12, wherein the first portion of the carrier lead wire is connected to the external portion of the anode lead tape by resistance welding.

18. The method of claim 12, wherein the second portion of the second anode lead is connected to the anode termination by laser welding.

19. The method of claim 12, further comprising:
    anodically oxidizing the sintered, porous anode body to form a dielectric layer; and
    applying a solid electrolyte to the anodically oxidized sintered, porous anode body to form a cathode.

20. The method of claim 19, further comprising:
    forming an electrical connection between the cathode and a cathode termination; and
    encapsulating the capacitor with a molding material such that at least a part of the anode termination and a part of the cathode termination remain exposed.

* * * * *